US008797359B2

(12) United States Patent
Tripathi et al.

(10) Patent No.: US 8,797,359 B2
(45) Date of Patent: Aug. 5, 2014

(54) INLINE IMAGE ROTATION

(75) Inventors: Brijesh Tripathi, San Jose, CA (US);
Nitin Bhargava, San Jose, CA (US);
Craig M. Okruhlica, San Jose, CA (US)

(73) Assignee: Apple Inc., Cupertino, CA (US)

( * ) Notice: Subject to any disclaimer, the term of this patent is extended or adjusted under 35 U.S.C. 154(b) by 147 days.

(21) Appl. No.: 13/306,429

(22) Filed: Nov. 29, 2011

(65) Prior Publication Data

US 2013/0135351 A1 May 30, 2013

(51) Int. Cl.
*G09G 5/00* (2006.01)

(52) U.S. Cl.
USPC ............ 345/649; 345/650; 345/653; 345/655; 345/656; 345/560

(58) Field of Classification Search
USPC ........................................ 345/649–659, 560
See application file for complete search history.

(56) References Cited

U.S. PATENT DOCUMENTS

| | | | |
|---|---|---|---|
| 5,670,982 A | 9/1997 | Zhao | |
| 5,854,641 A | 12/1998 | Howard et al. | |
| 5,990,912 A | 11/1999 | Swanson | |
| 6,104,843 A * | 8/2000 | Nakashima | 382/305 |
| 6,628,294 B1 | 9/2003 | Sadowsky et al. | |
| 6,847,385 B1 | 1/2005 | Garritsen | |
| 6,891,539 B1 * | 5/2005 | Maruyama et al. | 345/629 |
| 7,512,287 B2 | 3/2009 | Van Baarsen et al. | |
| 7,576,758 B2 | 8/2009 | Kothandaraman et al. | |
| 7,791,611 B1 * | 9/2010 | Holmqvist et al. | 345/545 |
| 7,924,296 B2 | 4/2011 | Guha | |
| 8,405,668 B2 * | 3/2013 | Bratt et al. | 345/568 |
| 2004/0052431 A1 | 3/2004 | Locker et al. | |
| 2005/0052441 A1 | 3/2005 | Stevens | |
| 2005/0248575 A1 * | 11/2005 | Chou et al. | 345/473 |
| 2007/0195113 A1 | 8/2007 | Walton et al. | |
| 2010/0110492 A1 | 5/2010 | Matsuhira et al. | |
| 2011/0227920 A1 * | 9/2011 | Adams et al. | 345/426 |

FOREIGN PATENT DOCUMENTS

JP  H08-258344  10/1996

(Continued)

OTHER PUBLICATIONS

International Search Report and Written Opinion in application No. PCT/US2012/055429 mailed Dec. 10, 2012.

(Continued)

*Primary Examiner* — Xiao Wu
*Assistant Examiner* — Todd Buttram
(74) *Attorney, Agent, or Firm* — Rory D. Rankin; Meyertons, Hood, Kivlin, Kowert & Goetzel, P.C.

(57) ABSTRACT

Methods and apparatus for performing an inline rotation of an image. The apparatus includes a rotation unit for reading pixels from a source image in an order based on a specified rotation to be performed. The source image is partitioned into multiple tiles, the tiles are processed based on where they will be located within the rotated image, and each tile is stored in a tile buffer. The target pixel addresses within a tile buffer are calculated and stored in a lookup table, and when the pixels are retrieved from the source image by the rotation unit, the lookup table is read to determine where to write the pixels within a corresponding tile buffer.

23 Claims, 12 Drawing Sheets

(56) References Cited

FOREIGN PATENT DOCUMENTS

| | | |
|---|---|---|
| JP | H10208031 | 8/1998 |
| JP | H11146159 | 5/1999 |
| JP | 2001-183940 | 7/2001 |
| JP | 2003-338922 | 11/2003 |
| JP | 2008-085450 | 4/2008 |
| JP | 2009-278462 | 11/2009 |
| JP | 2010-114576 | 5/2010 |

OTHER PUBLICATIONS

Office Action in Australian Application No. 2012227210 issued Aug. 6, 2013, 3 pages.

Office Action from Japanese Application No. 2012-230296, mailed Oct. 23, 2013, pp. 1-6.

Office Action from Korean Patent Application No. 10-2012-109286, mailed Dec. 18, 2013, pp. 1-15.

Office Action from Japanese Application No. 2012-230296, mailed Mar. 5, 2014, pp. 1-6.

\* cited by examiner

Lookup Table
18

| Transaction ID | Tile Buffer # | Line # | Column # |
|---|---|---|---|
| 0x0040 | 24 | 0 | 0 |
| 0x0041 | 24 | 0 | 8 |
| 0x0042 | 24 | 0 | 16 |
| 0x0043 | 24 | 0 | 24 |
| 0x0044 | 24 | 0 | 32 |
| 0x0045 | 24 | 0 | 40 |
| 0x0046 | 24 | 0 | 48 |
| 0x0047 | 24 | 0 | 56 |
| ⋮ | ⋮ | ⋮ | ⋮ |

*Partioning of a Source Image (Without Rotation) 50* →

| (0, 0) | (1, 0) | (2, 0) |
|---|---|---|
| (0, 1) | (1, 1) | (2, 1) |
| (0, 2) | (1, 2) | (2, 2) |

*Partioning of the Source Image (For a 90 Degree Rotation) 52* →

| (1, 0) | (1, 1) | (1, 2) | (1, 3) | (1, 4) |
|---|---|---|---|---|
| (0, 0) | (0, 1) | (0, 2) | (0, 3) | (0, 4) |

*Rotated Image 54* →

| (0, 0) | (1, 0) |
|---|---|
| (0, 1) | (1, 1) |
| (0, 2) | (1, 2) |
| (0, 3) | (1, 3) |
| (0, 4) | (1, 4) |

*FIG. 4*

INLINE IMAGE ROTATION

BACKGROUND

1. Field of the Invention

The present invention relates generally to graphics information processing, and in particular to methods and mechanisms for rotating an image.

2. Description of the Related Art

Computing devices and in particular mobile devices often have limited memory resources and a finite power source such as a battery. Computing devices with displays usually include different types of graphics hardware to manipulate and display video and images. Graphics hardware can perform many different types of operations to generate and process images intended for a display. One common operation performed by graphics hardware is an image rotation. Typically, large buffers are utilized to rotate an image. However, these buffers require large amounts of silicon area and can consume additional power, increasing the cost of the graphics hardware and reducing the battery life of mobile devices.

SUMMARY

Systems and methods of rotating an image are contemplated.

In various embodiments, an apparatus is contemplated which may perform inline rotation of a source image to produce a rotated image. The apparatus may be part of a multi-stage graphics processing pipeline. The apparatus may include a fetch unit for fetching source image pixels from a memory, and may be configured to generate addresses of pixels within the source image stored in a memory. The fetch unit may further generate the pixel addresses in an order based on the type of rotation being performed on the source image. The source image may be partitioned into a plurality of tiles, and the partitioning may be based on the rotation being performed. Pixels may be fetched from the source image on a tile-by-tile basis.

The apparatus may also include one or more tile buffers for storing retrieved pixels. The pixels may be stored in target locations within the tile buffer(s), and the target locations may be based on the rotation being performed. In one embodiment, each tile buffer may include a plurality of separate individual random access memories (RAMs) for storing a portion of data from a given rotated tile of the image. In various embodiments, the pixels in the tile buffer(s) may be read and processed by a subsequent stage in the graphics processing pipeline.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 illustrates three partitioned images in accordance with one or more embodiments.

DETAILED DESCRIPTION OF EMBODIMENTS

Figure 1:
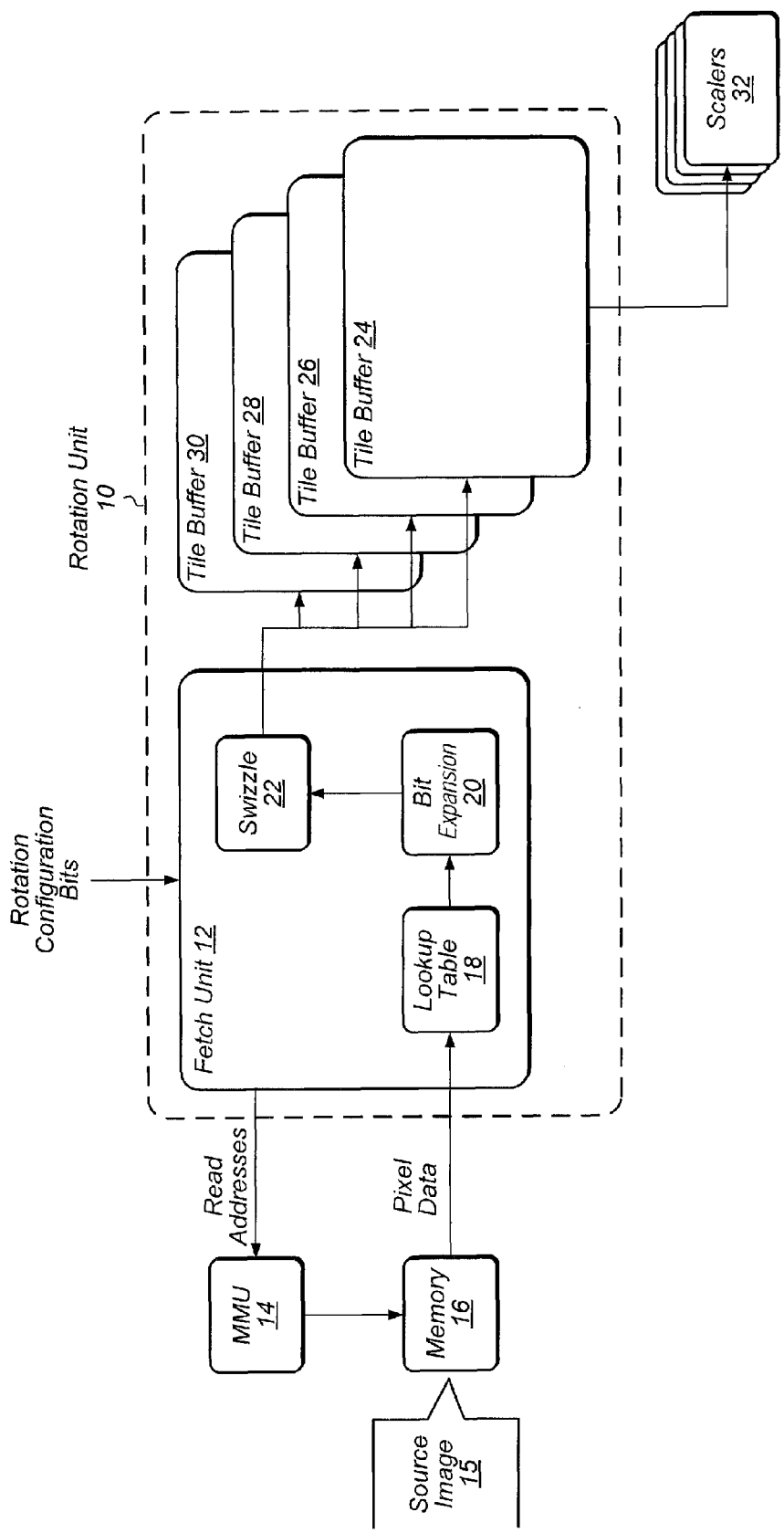
FIG. 1 is a block diagram that illustrates one embodiment of a rotation unit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a fetch unit . . . ." Such a claim does not foreclose the apparatus from including additional components (e.g., a processor, a cache, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/ component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical) unless explicitly defined as such. For example, in a rotation unit with four tile buffers, the terms "first" and "second" tile buffers can be used to refer to any two of the four tile buffers.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a rotation unit is shown. In various embodiments, rotation unit 10 may be incorporated within a graphics processing pipeline within a system on chip (SoC). In one embodiment, the graphics processing pipeline may be a separate processor chip or co-processor. In some embodiments, the graphics processing pipeline may deliver graphics data to a display controller or display device. In other embodiments, the graphics processing pipeline may deliver graphics data to a storage location in memory, for further processing or for later consumption by a display device. In other embodiments, rotation unit 10 may be incorporated within an integrated circuit (IC), an application specific integrated circuit (ASIC), an apparatus, or any of various other similar devices.

Source image 15 may be a still image or a frame of a video stream. Source image 15 may be represented by large numbers of discrete picture elements known as pixels. In digital imaging, the smallest item of information in an image or video frame is a "pixel". Pixels are generally arranged in a regular two-dimensional grid. Each pixel in source image 15 may be represented by one or more pixel components. The pixel components may include color values for each color in the color space in which the image is represented. For example, the color space may be a red-green-blue (RGB) color space. Each pixel may thus be represented by a red component, a green component, and a blue component. The value of the components may represent a brightness or intensity of the corresponding color in that pixel. Other color spaces may also be used, such as the luminance and chrominance representation (YCrCb). Furthermore, additional pixel components may be included. For example, an alpha value for blending may be included with the RGB components to form an ARGB color space.

Rotation unit 10 may be configured to read pixels from source positions in source image 15 and write them to positions in tile buffers 24-30 that correspond to target positions in the destination image. Rotation unit 10 may perform rotations in multiples of 90 degrees and/or flips in horizontal or vertical directions. The specified rotation may be indicated by the rotation configuration bits, which may be inputs to rotation unit 10. As used throughout this disclosure, the term "rotation" may refer to a rotation such as a 90 degree, 180 degree, or 270 degree (clockwise or counter-clockwise) rotation in the traditional meaning of the word. Additionally, "rotation" may refer to a flip (i.e., an x-swap or y-swap direction change of the image).

Rotation unit 10 may include fetch unit 12 to fetch the pixels in a specified order from source image 15 stored in memory 16. In one embodiment, fetch unit 12 may generate addresses of pixels in source image 15. Fetch unit 12 may determine the order in which addresses are generated based on the type of rotation being performed. Fetch unit 12 may issue read requests using the generated addresses, and the addresses may be utilized by memory management unit (MMU) 14 to perform read operations from memory 16. In another embodiment, a logic fabric interface (not shown) may be included between MMU 14 and memory 16. In one embodiment, fetch unit 12 may perform direct memory access (DMA) read operations to read pixels from source image 15. Fetch unit 12 may include a DMA controller to perform the DMA read operations.

MMU 14 may be configured to perform memory address translations. In one embodiment, MMU 14 may utilize virtual addressing to allow fetch unit 12 to address a virtual address range corresponding to source image 15. MMU 14 may perform virtual to physical translation to map the virtual address to an actual physical address of memory 16. In various embodiments, MMU 14 may allow fetch unit 12 to prefetch translations to avoid latency incurred by waiting on translations that are demand fetched on misses. In one embodiment, fetch unit 12 may include a prefetch engine (not shown) to generate virtual addresses for the prefetches. In this embodiment, MMU 14 may include a prefetch unit (not shown) to process the prefetch requests from fetch unit 12. In one embodiment, fetch unit 12 may send prefetch requests one tile ahead of the current tile being fetched. The prefetch requests may be used to populate a streaming translation table (STT) (not shown) within MMU 14. When fetch unit 12 issues an actual memory request, the request may be translated immediately using the STT.

Fetch unit 12 may be configured to fetch pixels from source image 15 and write the pixels to the appropriate locations within tile buffers 24-30. In one embodiment, fetch unit 12 may issue a read request with a specific transaction identifier (ID) corresponding to one or more pixels. Fetch unit 12 may calculate the destination locations for the one or more pixels in a tile of the rotated image. Then, fetch unit 12 may store the transaction ID in an entry in lookup table 18, and the pixel destination locations may be included in the entry. When the pixels for that specific transaction ID are received from memory 16, the corresponding entry in lookup table 18 may be retrieved and the location information may be used to determine where to write the pixels into a given tile buffer of tile buffers 24-30.

In one embodiment, lookup table 18 may be a random-access memory (RAM). In various embodiments, lookup table 18 may include various numbers of entries. The fetched pixels may be stored in the target locations in tile buffers 24-30 based on the location data stored in lookup table 18. The pixels are effectively repositioned as they are written to target positions in a given tile buffer of tile buffers 24-30.

Each of tile buffers 24-30 may store a given tile of the rotated image. Source image 15 and the corresponding rotated image each may be apportioned into a plurality of tiles based on the specified rotation. In one embodiment, the tiles in the rotated image may be 16 rows of pixels by 128 columns of pixels. However, the tile size may vary in other embodiments. The width of source image 15 may be greater than the width of the tile such that multiple tiles may be utilized to make up each row of source image 15. Also, the length of source image 15 may be greater than the length of the tile such that multiple tiles may be utilized to make up each column of source image 15. Each of tile buffers 24-30 may store a given rotated tile of source image 15, and after a tile buffer has been read by the next stage in the pipeline, then the tile buffer may be filled with a new tile of source image 15. In one embodiment, each color component may include four tile buffers for storing four tiles of the rotated image. For example, if source image 15 is represented in an ARGB format, then there may be four tile buffers for the alpha color component, four tile buffers for the red color component, four tile buffers for the green color component, and four tile buffers for the blue color component.

In one embodiment, the tiles stored in tile buffers 24-30, which make up a portion of the rotated image, may be conveyed to a subsequent stage of the image processing pipeline. In one embodiment, the subsequent stage of the pipeline may be a scaler unit (e.g., scalers 32) to upscale or downscale the rotated tiles of the destination image. Scalers 32 are representative of any number of vertical and horizontal scalers which may be utilized within the pipeline. In another embodiment, the next stage in the pipeline may be some other unit (e.g., color space conversion unit, normalization unit, downsampling unit) other than scalers 32. In a further embodiment, rotation unit 10 may convey the rotated tiles of the destination image to a display unit (not shown). In a still further embodiment, rotation unit 10 may convey the rotated tiles of the target image to memory 16 or another storage location.

In one embodiment, each read request generated by fetch unit 12 may read up to 64 bytes of data. In other embodiments, the read requests may request other amounts of data. In one embodiment, each read request may be directed toward a line (i.e., row) of a tile of source image 15. If the target tile size for the rotated image is 16 rows by 128 columns, and the specified rotation is 90 or 270 degrees, then source image 15 may be partitioned into tiles of 16 columns by 128 rows. Fetch unit 12 may fetch the top line of the tile and then move down line by line to the bottom of the tile. Each fetch may request pixels from a line of a tile of source image 15. It may take one or more fetches to retrieve an entire line of 16 pixels, and then the fetches will move down to the next line to retrieve the next 16 pixels, and then this process may continue until 128 lines have been retrieved for the entire tile. The 16 pixels from a row of source image 15 will make up a single column of the rotated image for the specified (90 or 270 degrees) rotation. In other embodiments, other sizes of tiles (e.g., 256-by-24, 64-by-16, 512-by-32) may be utilized and other types of rotations may be performed.

In one embodiment, when pixels are received by rotation unit 10, an on-the-fly determination may be made on where to store the pixels in tile buffers 24-30. The determination may be based on location information stored in lookup table 18. In some embodiments, the pixels may return out of order and may be routed to the correct locations in the tile buffers 24-30 based on tag data, wherein the tags contain pixel destination information.

Fetch unit 12 may store transaction IDs and pixel destinations in lookup table 18. The pixel data may be returned out of order and may be conveyed to lookup table 18. Lookup table 18 may convey the pixels to bit expansion unit 20 to expand the number of bits per pixel depending on the native format of source image 15 and the target format of the rotated image. The bit expansion unit may not be included if the pixels retrieved from memory are the same size as is utilized by the next stage in the pipeline (i.e., scalers 32). In some embodiments, swizzle unit 22 may rearrange the order of fetched pixels. For example, in one embodiment, the pixels may be received in an order of blue, green, red, and alpha color components. Swizzle unit 22 may reorder the pixels to the order of alpha, red, green and blue color components.

The number of bits used to store each pixel may depend on the particular format being utilized. For example, pixels in some systems may require 8 bits, whereas pixels in other systems may require 10 bits, and so on, with any of various numbers of bits per pixel being used in various systems. In one embodiment, source image 15 may contain pixels represented by 8 bits. The graphics pipeline may utilize pixels of 10 bits, and so the pixels received from source image 15 may be expanded by bit expansion unit 20 from 8 bits to 10 bits. It is noted that in some embodiments, bit expansion unit 20 and swizzle unit 22 may not be included or may be pass-through units. In some embodiments, the fetched pixels may be conveyed directly to the tile buffers 24-30 without passing through bit expansion unit 20 and swizzle unit 22.

Although lookup table 18, bit expansion unit 20, and swizzle unit 22 are shown as being part of fetch unit 12, this is for illustrative purposes only, and in other embodiments, the units may be arranged in other suitable manners. For example, in another embodiment, lookup table 18, bit expansion unit 20, and/or swizzle unit 22 may be separate units distinct from fetch unit 12.

Each tile buffer 24-30 may correspond to a different tile of the rotated image. In other embodiments, other numbers of tile buffers besides four may be utilized for storing pixels from rotated tiles. Additionally, each tile buffer may include multiple RAMs, and each RAM may store a single row of a given image tile. For example, in one embodiment, each tile buffer may include 16 individual RAMs corresponding to 16 rows of an image tile. Other embodiments may employ other tile sizes with other number of rows besides 16. In these embodiments, there may be other numbers of RAMs in each buffer corresponding to the amount of rows per tile. For example, in another embodiment, if the tile size is 32 rows by 128 columns, then there may be 32 RAMs per tile buffer.

Components shown within FIG. 1 may be coupled to each other using any suitable bus and/or interface mechanism. In some embodiments, these components may be connected using the Advanced Microcontroller Bus Architecture (AMBA®) protocol (from ARM® Holdings) or any other suitable on-chip interconnect specification for the connection and management of logic blocks. Examples of AMBA buses and/or interfaces may include Advanced eXtensible Interface (AXI), Advanced High-performance Bus (AHB), Advanced System Bus (ASB), Advanced Peripheral Bus (APB), and Advanced Trace Bus (ATB).

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Figure 2:
FIG. 2 is a lookup table in accordance with one or more embodiments.

Turning now to FIG. 2, one embodiment of a lookup table is shown. Each entry of lookup table 18 may include several fields of data, including a transaction identifier (ID) field, tile buffer number field, line (row) number field, and column number field. The transaction ID field may correspond to a specific read request for one or more addresses within source image 15. Fetch unit 12 (of FIG. 1) may store an entry corresponding to a read request in lookup table 18 when issuing a read request for one or more pixels. Each entry may include location coordinates which indicate where source pixel(s) should be located in a tile of the post-rotation image. In one embodiment, the post-rotation image tile may be stored in a tile buffer, and the pixels may be read from the tile buffer by a next stage of the overall graphics processing pipeline.

When pixels corresponding to a read request are retrieved from memory, the corresponding entry in lookup table 18 may be utilized to determine where in the tile buffers to store the retrieved pixels. For example, when data corresponding to read transaction ID 43 returns from memory, the entry for transaction ID 43 may be utilized by a rotation unit to store the pixels in tile buffer 24 at a starting location of line 0 column 24. In one embodiment, the number of pixels retrieved in a single transaction may be eight. In other embodiments, other numbers of pixels may be retrieved in a single transaction.

The entries shown in lookup table 18 are for illustrative purposes only. Lookup table 18 may include less than eight or greater than eight entries in other embodiments, and lookup table 18 may be organized in a different manner and contain other fields of information. For example, in one embodiment, rotation configuration bits indicating the type of rotation may be stored in table 18. In another embodiment, each entry may include a valid bit to indicate when the entry has been used and therefore may be overwritten by another entry for a subsequent transaction ID. In other embodiments, other types of information may be stored in lookup table 18, and lookup table 18 may be organized in any suitable fashion.

Figure 3:
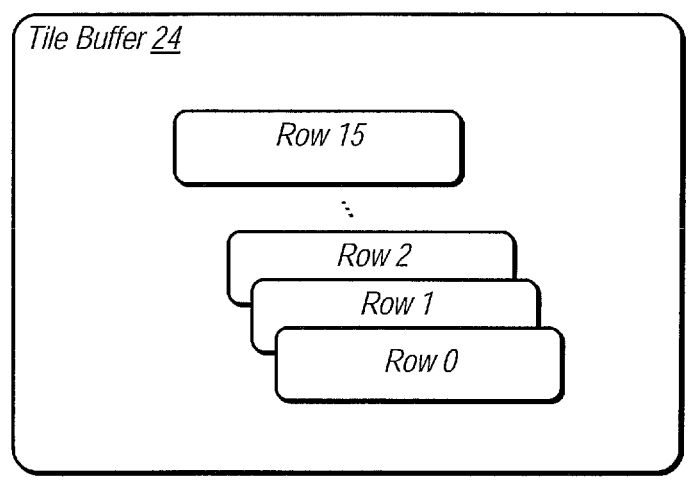
FIG. 3 is a block diagram that illustrates one embodiment of a rotation tile buffer.

Referring now to FIG. 3, a block diagram of one embodiment of a rotation tile buffer is shown. Tile buffer 24 may include 16 separate rows, each of which may be a separate RAM. The 16 separate RAMs may be utilized to store separate rows of an image tile, such as row 0, row 1, row 2, and so on, up to row 15. Each of the RAMs may store pixels associated with a separate row of a tile of the rotated image. In this embodiment, the tile size may be 16 rows by 128 columns. In other embodiments, other sizes of tiles may be utilized, and tile buffer 24 may include other numbers of RAMs corresponding to the number of rows in a tile.

In one embodiment, the next stage in the graphics pipeline may be a vertical scaler unit. The vertical scaler unit may fetch an entire column of pixels from tile buffer 24 in a single clock cycle. In some embodiments, each RAM of tile buffer 24 may allow a single access per clock cycle. Therefore, tile buffer 24 is arranged with each row stored in a separate RAM such that the vertical scaler is able to read a single pixel from each row in each clock cycle. In other embodiments, tile buffer 24 may be structured in other ways, depending on how data is read from tile buffer 24 by the next stage in the graphics pipeline.

Turning now to FIG. 4, three partitioned images are shown. The partitioning of a source image if no rotation were being performed is depicted by source image 50.

Source image 50 is partitioned into eight tiles, labeled (0,0)-(2,2), and the order in which tiles are processed begins in the top left corner moving down the left-most column of tiles, starting with blocks labeled (0,0), (0,1), and (0,2). Then, after the left-most column is fetched, then the next column to the right (tiles (1,0), (1,1), and (1,2)) may be fetched, and so on.

The partitioning of a source image to perform a 90 degree clockwise rotation is depicted by source image block 52. In this case, the partitioning of the source image is based on the specified rotation, such that the first tile to be processed is the bottom left tile of source image 52. The bottom left tile of source image 52 will become the top left column in rotated image 54 after performing the 90 degree rotation, which is why the bottom left tile of source image 52 is the first tile to be processed. The tiles of source image 52 will be processed on the bottom row of tiles starting in the left-most tile (0,0), and proceeding through tiles (0,1), (0,2), (0,3), and (0,4). Then the top row of tiles may be processed from tile (1,0) through tile (1,4). The processing of tiles of source image 52 proceeds in a fashion determined by the 90 degree rotation, such that the tiles may be processed as they will be situated after the specified rotation is performed. The first tile processed may be the tile that will end up at the top left of rotated image 54. Then the image may be processed going down the first column of tiles (of rotated image 54), then proceeding to the next column to the right, and so on. Rotated image 54 depicts how the destination image will appear after source image 52 has been processed and rotated by a rotation unit (e.g., rotation unit 10 of FIG. 1). Partitioning of a source image into tiles for other types of rotations (other than a 90 degree rotation) may be carried out in a similar fashion based on the specific type of rotation being performed. Also, the sizes of the images and tiles shown in FIG. 4 are shown for illustrative purposes only, and other images with other numbers and sizes of tiles may be processed in a similar fashion.

Figure 5:
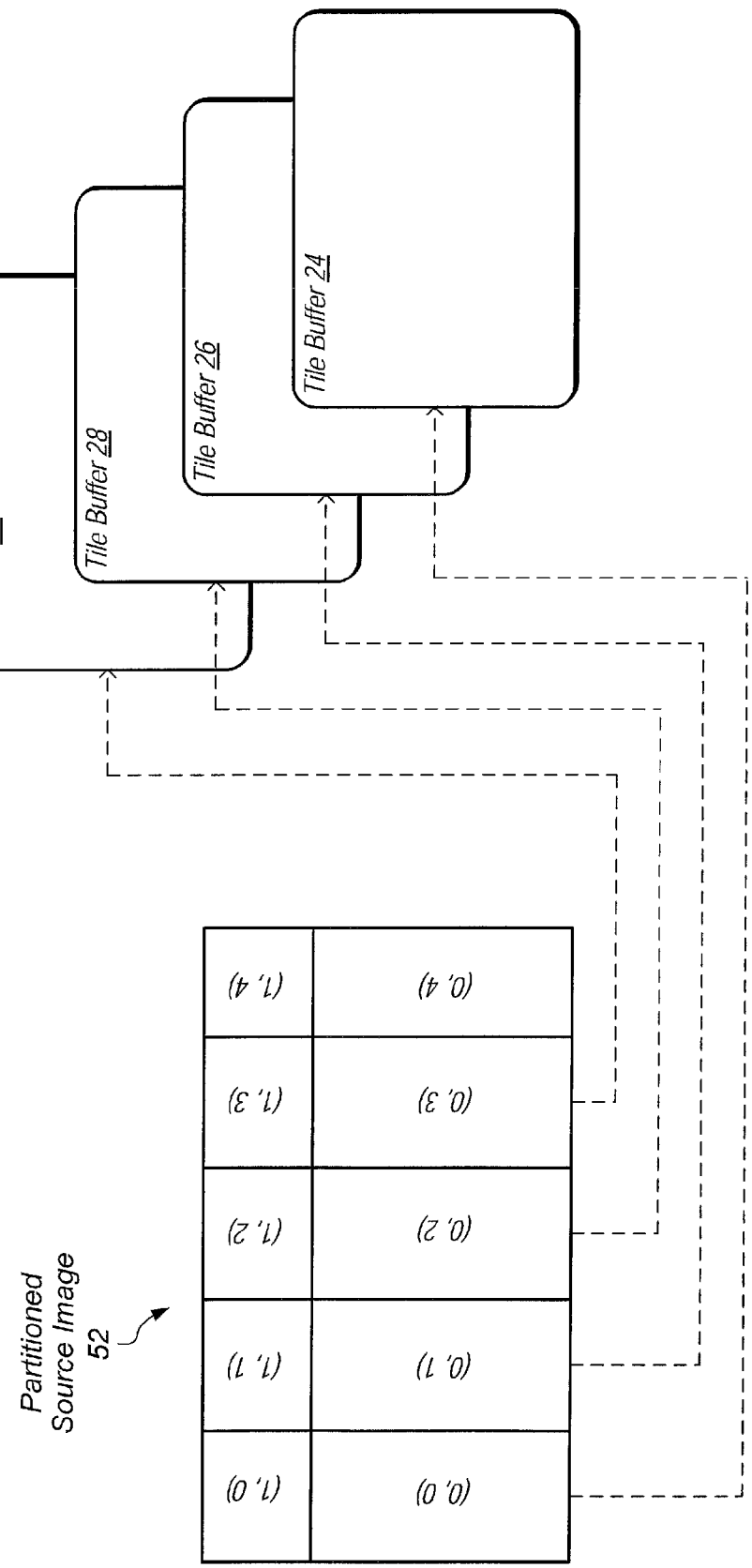
FIG. 5 is a block diagram of one embodiment of the correspondence between a partitioned source image and four tile buffers.

Referring now to FIG. 5, one embodiment of the correspondence between a partitioned source image and tile buffers is shown. Source image 52 (partitioned for a 90 degree clockwise rotation) is shown in FIG. 5, and arrows connect the first four tiles ((0,0), (0,1), (0,2), and (0,3)) being processed and the corresponding tile buffers 24-30 where the tiles may be stored. For example, tile (0,0) may be stored in tile buffer 24, tile (0,1) may be stored in tile buffer 26, tile (0,2) may be stored in tile buffer 28, and tile (0,3) may be stored in tile buffer 30.

FIG. 5 shows the routing of tiles to tile buffers for a single color component of partitioned source image 52. Each color component of partitioned source image 52 may be stored in a separate tile buffer. For example, with an ARGB format, a total of 16 tile buffers may be utilized to store all of the color components of the first four tiles of image 52.

After tile buffers 24-30 have been read by a subsequent stage of the graphics pipeline, the next four tiles of partitioned source image 52 may be written to tile buffers 24-30. In one embodiment, the next stage of the graphics pipeline may read from tile buffers 24-30 one at a time, such that if tile buffer 24 has been read, then the next tile of partitioned source image 52 may be written to tile buffer 24, and then the process will stall until tile buffer 26 has been read, and so on.

Figure 6:
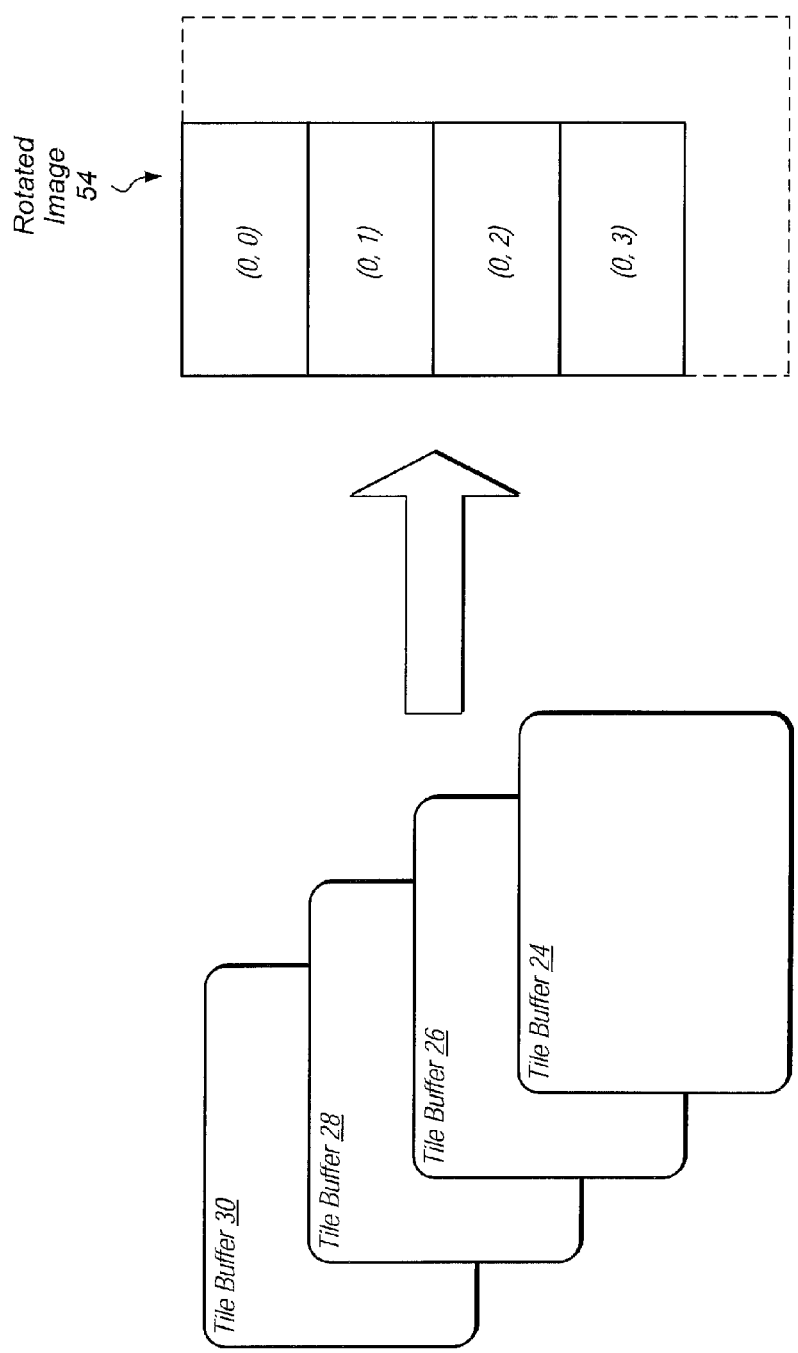
FIG. 6 is a block diagram of one embodiment of four tile buffers and a portion of a partitioned rotated image.

Turning now to FIG. 6, four tile buffers and a portion of a partitioned rotated image are shown. Tile buffers 24-30 may store the four tiles from source image 52 as shown in FIG. 5. These four tiles from source image 52 may correspond to the four tiles ((0,0), (0,1), (0,2), and (0,3)) shown in rotated image 54. The rotation of the pixels from the original tiles of source image 52 into rotated image 54 may be performed as pixels are written into tile buffers 24-30. The four tiles of rotated image 54 may be read from tile buffers 24-30 by a subsequent stage (not shown) of the graphics pipeline. Alternatively, the pixels stored in the four tiles of rotated image 54 may be conveyed to a display (not shown) or to a location in memory (not shown).

Tiles may be stored in rotated image 54 beginning in the upper-left block of the image, and then processing may proceed down the left-most column of tiles until reaching the bottom edge of the image. Then tiles may be stored continuing at the top of the second left-most column and continue in this manner throughout the rest of the image. In another embodiment, tiles may be stored in rotated image 54 in a different order.

Figure 7:
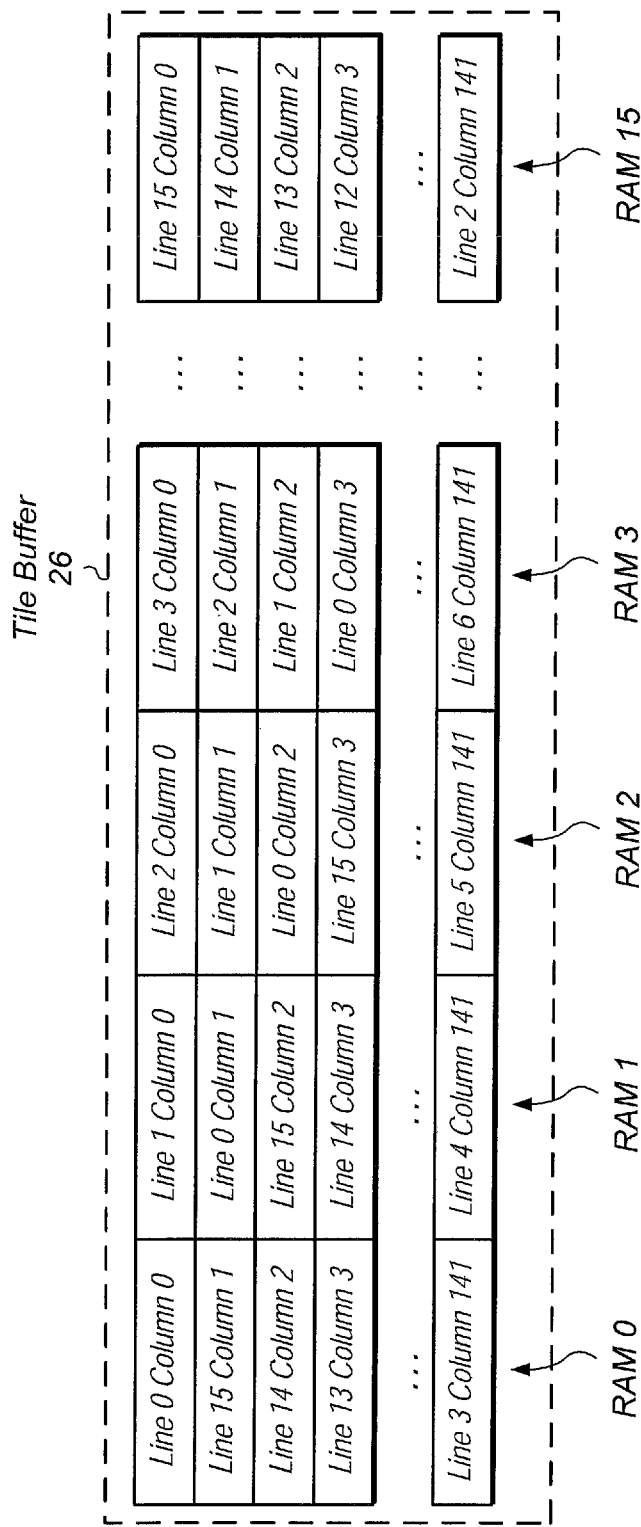
FIG. 7 is a block diagram of one embodiment of a tile buffer.

Referring now to FIG. 7, a block diagram of one embodiment of a tile buffer is shown. In various embodiments, the size of tile buffer 26 may vary to match the size of an individual image tile. In one embodiment, an individual image tile may be 16 lines by 128 columns, such that each line contains 128 pixels. In another embodiment, the image tile lines may be extended to 142 pixels by fetching an additional seven pixels on the right and left sides of the tile. This fetching of pixels from adjacent tiles on the right and left edges of the tile may be performed to facilitate a 15-tap polyphase horizontal scaler filter in a subsequent stage of the graphics pipeline.

Tile buffer 26 is shown as having a size of 142 lines by 16 columns. In one embodiment, this corresponds to a source image tile size of 16 lines by 142 columns and a specified rotation of 90 degrees or 270 degrees. The labels in each box refer to the pixel location within the rotated image. The pixels may be fetched from the source image and stored in the appropriate location within tile buffer 26 based on the specified rotation. The label in each box of tile buffer 26 refers to the pixel location within a tile of the rotated image.

The arrangement of pixels shown in tile buffer 26 may be utilized to allow multiple pixels to be written to tile buffer 26 in a single clock cycle. For example, in one embodiment, each vertical arrangement of pixels of tile buffer 26 may correspond to a separate RAM. As such, each of RAMs 0-15 may only allow a single pixel to be written to or read from in a single clock cycle. Therefore, the pixels are arranged in each RAM such that at most only one pixel may need to be written to or read from the RAM per clock cycle, based on how the pixel data is fetched from the original source image.

In one embodiment, pixels may be fetched from a single line per fetch from the original source image, and each set of fetched pixels may be written to a single line in tile buffer 26 (e.g., line 0-column 0, line 1-column 0, etc.) if there is a rotation, and to a diagonal line in tile buffer 26 (e.g., line 0-column 0, line 0-column 1, line 0-column 2, etc.) if there is not a rotation. Also, the pixel arrangement allows for 16 pixels targeted to a single column of the rotated image to be read out of tile buffer 26 in a single clock cycle by the next stage of the graphics pipeline. It is noted that the size of tile buffer 26 shown in FIG. 7 is for illustrative purposes only, and in other embodiments, other tile sizes may be utilized. Additionally, in other embodiments, other arrangements of pixels within a tile buffer are possible and are contemplated.

Figure 8:
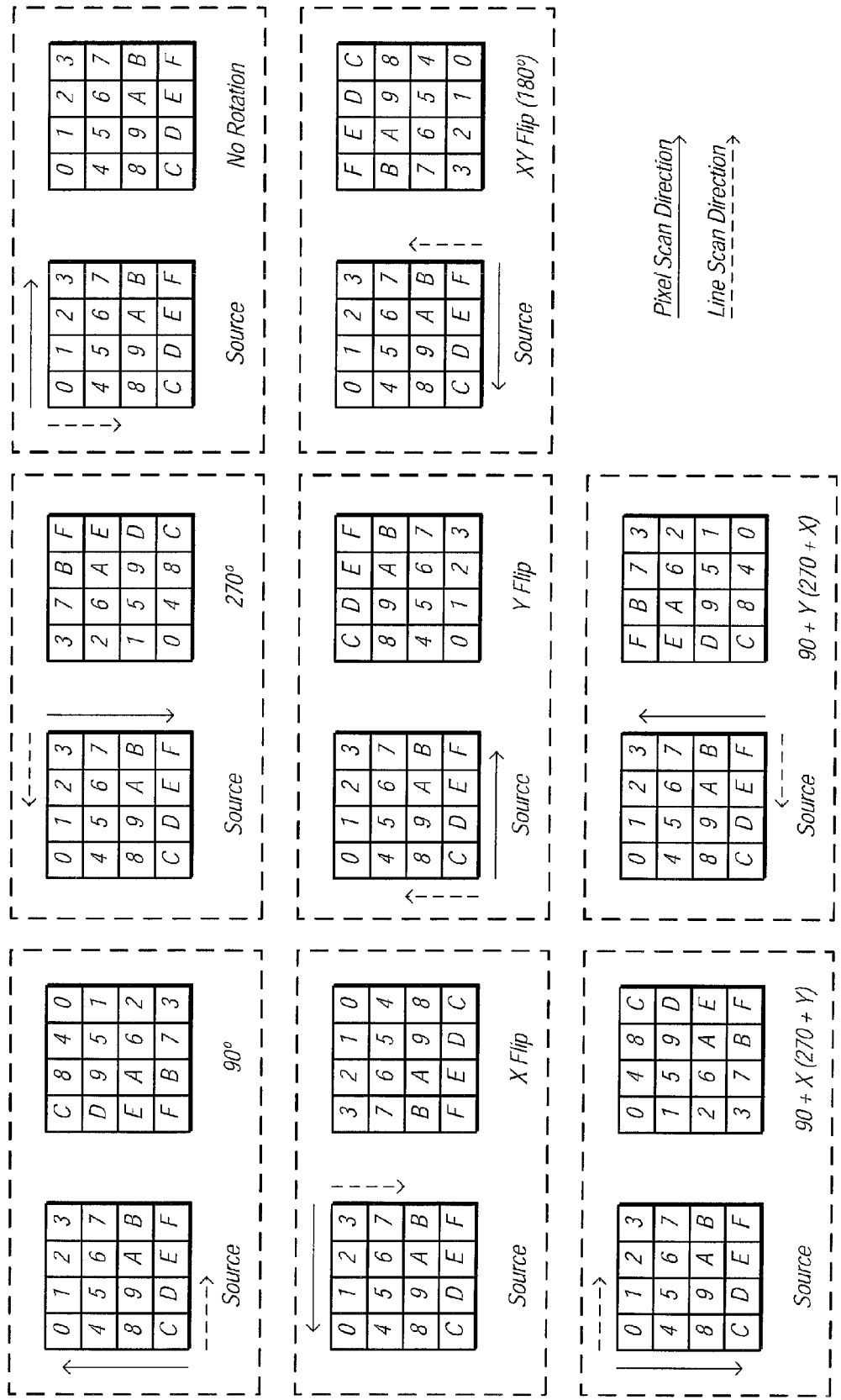
FIG. 8 is a group of block diagrams of various types of rotations which may be performed.

Turning now to FIG. 8, block diagrams of various types of rotations which may be performed are shown. There are two blocks shown for each type of rotation, one block shows the original source image labeled "Source", and the second block shows the final image after a specific type of rotation (e.g., 90 degrees, 270 degrees, X Flip). The two arrows next to each source image indicate the pixel scan direction (solid line) and the line scan direction (dashed line). The pixel scan direction indicates the direction pixels will be scanned (i.e., fetched) from each tile of the source image. The line scan direction indicates the direction lines will be scanned from each tile of the source image and the direction in which tiles will be scanned. The pixel and line scan directions determine the order in which read addresses are generated by a fetch unit, such as fetch unit 12 (of FIG. 1). Fetch unit 12 may rotate and/or flip a source image by operating on a tile of the image instead of operating on the entire image or a full row or column. Fetch unit 12 may be configured to fetch pixels from the source image in a tile-by-tile manner, starting with the tile of the source image targeted to the upper left-most tile of the rotated image.

Eight unique image orientations are shown for the 16 different rotate and flip combinations. Some of the combinations of rotation and flipping produce the same image orientation and therefore are only shown a single time in FIG. 8. For example, a 90 degree rotation followed by a flip in the x (horizontal) direction is equivalent to a 270 degree rotation followed by a flip in the y (vertical) direction.

It is noted that the examples shown in FIG. 8 are not an exhaustive list of the types of rotations that may be performed, and other types of rotations may be performed. In addition, the example images shown in FIG. 8 are square images, however source images of rectangular shapes may also be utilized by the methods and mechanisms disclosed herein. Also, in other embodiments, other pixel and line scan directions may be employed.

Figure 9:
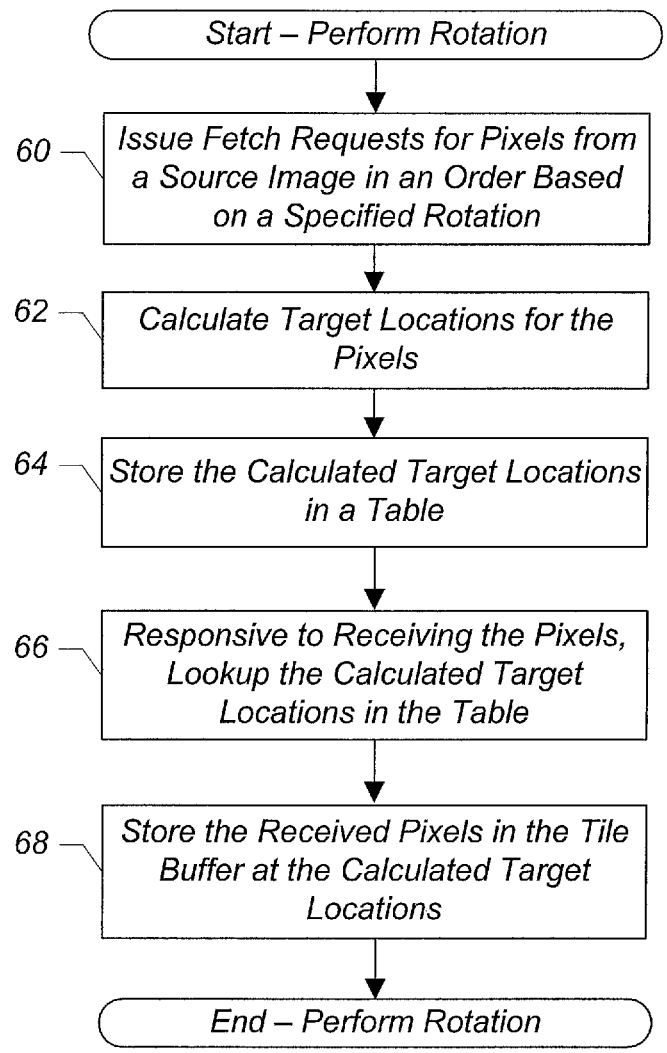
FIG. 9 is a generalized flow diagram illustrating one embodiment of a method for rotating pixels in an inline fashion.

Referring now to FIG. 9, one embodiment of a method for rotating pixels in an inline fashion is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, fetch requests may be issued for pixels from a source image in an order based on a specified rotation (block 60). The source image may be partitioned into tiles, and pixels may be fetched from each tile starting at a top row of the tile and moving down the tile row-by-row. The partitioning of the source image into tiles may be based on the specified rotation being performed. For example, in one embodiment with a tile size of 16 rows by 128 columns, if the specified rotation is 90 degrees, then the source image will be partitioned into tiles with 128 rows and 16 columns. Each row may contain 16 pixels, and the rows may be fetched starting with the top row moving along down to the bottom row, for a total of 128 rows. Each row that is read from the source image will become a column in the rotated image based on the 90 degree rotation. The first tile of the source image which is fetched may be the tile that will end up as the top left tile of the rotated image, and then tiles may be fetched going down the first column of tiles of the rotated image. Then, the next column of tiles to the right (as they will appear in the rotated image) may be fetched, and so on, until all of the tiles of the source image have been fetched.

Next, target locations may be calculated for the pixels (block 62). The target locations may be calculated based on the specified rotation. For example, if the specified rotation is 90 degrees, each row that is read from a tile in the source image is targeted to a column in the corresponding tile of the rotated image. The top row of a tile in the source image will target the right-most column in the corresponding tile in the rotated image, the second from the top row of the source image tile will target the second from the right-most column of the rotated image tile, and so on.

Then, the calculated target locations may be stored in a table (block 64). In one embodiment, the calculated target locations may be stored in a table simultaneously while the fetch requests are issued. When pixels are received from the source image, the corresponding target locations may be looked up in the table (block 66). The table may store entries for the issued fetch requests, and the entries may be identified based on a transaction ID of the request. Then, the received pixels may be stored in a tile buffer at the calculated target locations (block 68). These steps may be repeated until all of the pixels of all of tiles of the source image have been fetched and stored in the appropriate locations in the tile buffers according to the specified rotation. The tile buffers may be read by a subsequent stage or stored to memory such that each tile buffer may be reused to store pixels from subsequent tiles within the source image.

Figure 10:
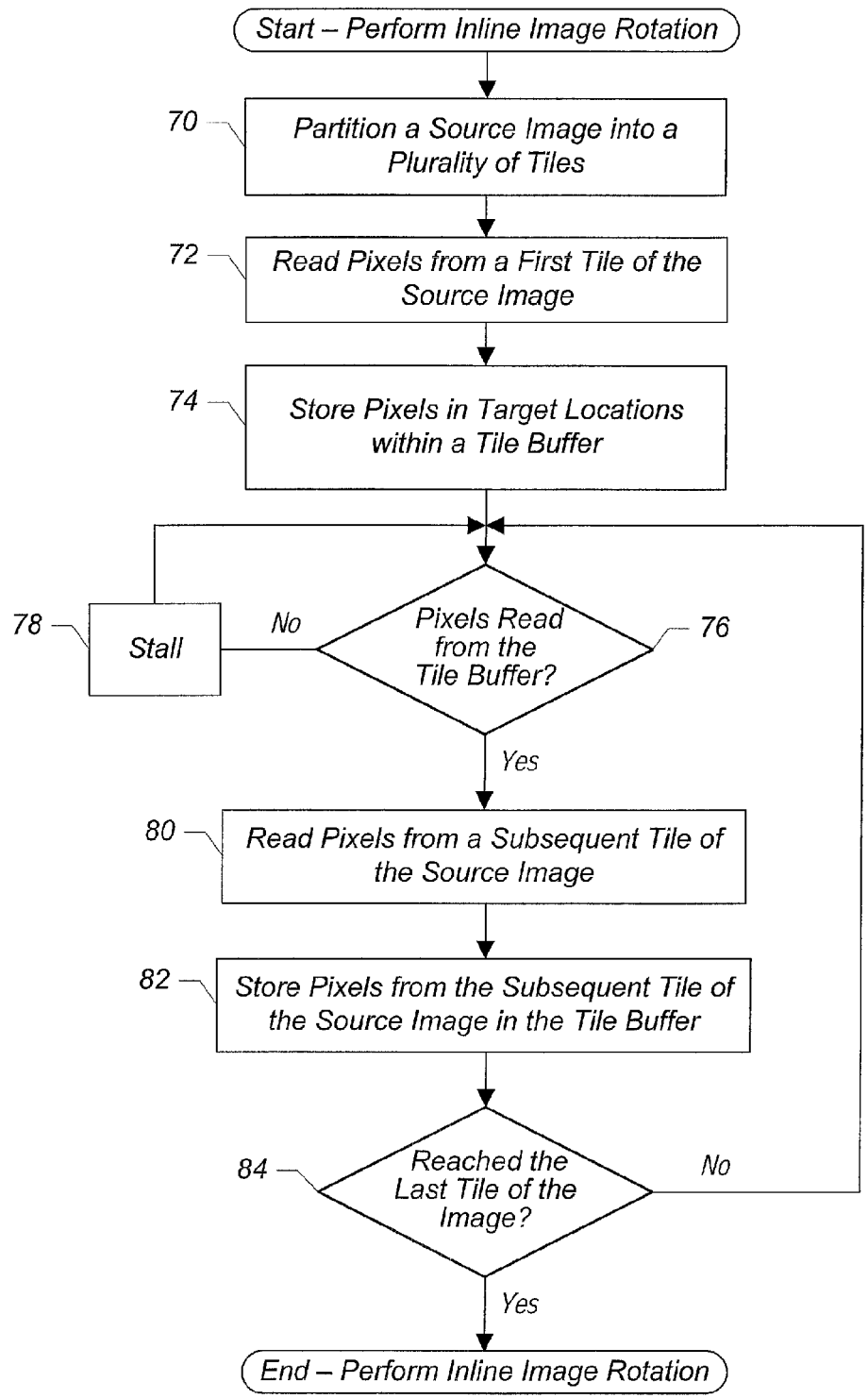
FIG. 10 is a generalized flow diagram illustrating one embodiment of a method for performing an inline rotation of an image.

Turning now to FIG. 10, one embodiment of a method for performing an inline rotation of an image is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a source image may be partitioned into a plurality of tiles (block 70). The partitioning of the source image may be based on a specified rotation which is being performed. The partitioning may not be an actual physical partitioning that changes the source image contents or where the source image is stored in a memory device. The partitioning may be a virtual partitioning of the source image into a logical arrangement of tiles. Pixels from a first tile of the source image may be read (block 72). In one embodiment, the first tile of the source image may be selected from the plurality of tiles of the source image based on the specified rotation. The tile of the source image which targets the top left tile of the rotated image may be the first tile selected from the source image. Next, the pixels may be stored in target locations within a tile buffer (block 74). The target locations may be calculated based on the specified rotation being performed.

Next, responsive to detecting that the tile buffer has been read by a subsequent stage in the graphics pipeline (conditional block 76), pixels may be read from a subsequent tile of the source image (block 80). Then, the pixels from the subsequent tile of the source image may be stored in the tile buffer (block 82). If the tile buffer has not been read by a subsequent stage in the graphics pipeline (conditional block 76), then the rotation unit may stall for one or more clock cycles (block 78). After stalling for one or more clock cycles, the rotation unit may again determine whether or not the tile buffer has been read by a subsequent stage in the graphics pipeline (conditional block 76). In one embodiment, the subsequent stage in the graphics pipeline may be a scaler unit for vertically and horizontally scaling the rotated image.

The order of the first tile and the subsequent tiles may be chosen based on the specified rotation. For example, the first tile chosen from the source image may be the tile that will end up as the top left tile of the rotated image. Then, the second tile chosen from the source image may be the tile that will end up below the top left tile of the rotated image. This process may continue for the tiles that will end up as the left-most column of tiles in the rotated image, and then the next column to the right may be processed, and so on. If the most recently processed tile was the last tile of the source image (conditional block 84), then the method may end. The last tile of the source image may target the bottom right tile of the rotated image. If the previous tile was not the last tile, then the method may return to conditional block 76.

In other embodiments, the order in which individual tiles are read based on their location in the rotated image may vary. For example, in another embodiment, the top right tile as it will be located within the rotated image may be the first tile processed, and then tiles may be processed going down the right-most column of the rotated image. Then, the columns of tiles may be processed in order from right to left. Variations of the order in which tiles are written into the tile buffers based on their locations within the rotated image are possible and are contemplated. In some embodiments, multiple tile buffers may be utilized to concurrently store multiple tiles of the rotated image. When one or more of the tile buffers are read by a subsequent stage or conveyed to a display unit or storage location, each tile buffer may be filled with pixels from another tile of pixels.

Figure 11:
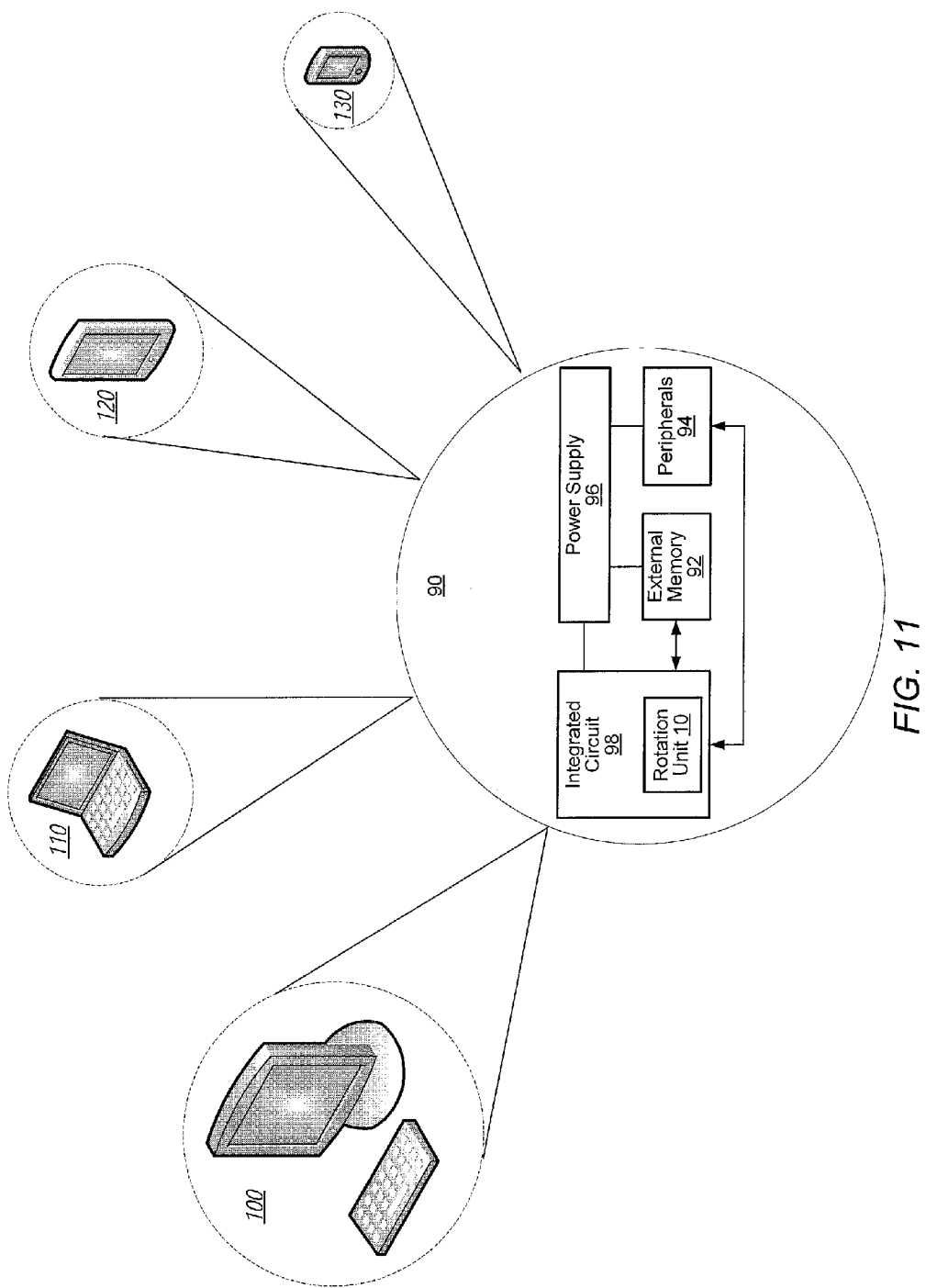
FIG. 11 is a block diagram of one embodiment of a system.

Referring next to FIG. 11, a block diagram of one embodiment of a system 90 is shown. As shown, system 90 may represent chip, circuitry, components, etc., of a desktop computer 100, laptop computer 110, tablet computer 120, cell phone 130, or otherwise. In the illustrated embodiment, the system 90 includes at least one instance of an integrated circuit 98 coupled to an external memory 92. Integrated circuit 98 may include one or more instances of rotation unit 10 (of FIG. 1). In some embodiments, integrated circuit 98 may be a SoC with one or more processors and one or more graphics processing pipelines.

The integrated circuit 98 is coupled to one or more peripherals 94 and the external memory 92. A power supply 96 is also provided which supplies the supply voltages to the integrated circuit 98 as well as one or more supply voltages to the memory 92 and/or the peripherals 94. In various embodiments, power supply 96 may represent a battery (e.g., a rechargeable battery in a smart phone, laptop or tablet computer). In some embodiments, more than one instance of the integrated circuit 98 may be included (and more than one external memory 92 may be included as well).

The memory 92 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with integrated circuit 98 in a chip-on-chip configuration, a package-on-package configuration, or a multi-chip module configuration.

The peripherals 94 may include any desired circuitry, depending on the type of system 90. For example, in one embodiment, peripherals 94 may include devices for various types of wireless communication, such as wifi, Bluetooth, cellular, global positioning system, etc. The peripherals 94 may also include additional storage, including RAM storage, solid state storage, or disk storage. The peripherals 94 may include user interface devices such as a display screen, including touch display screens or multitouch display screens, keyboard or other input devices, microphones, speakers, etc.

Figure 12:
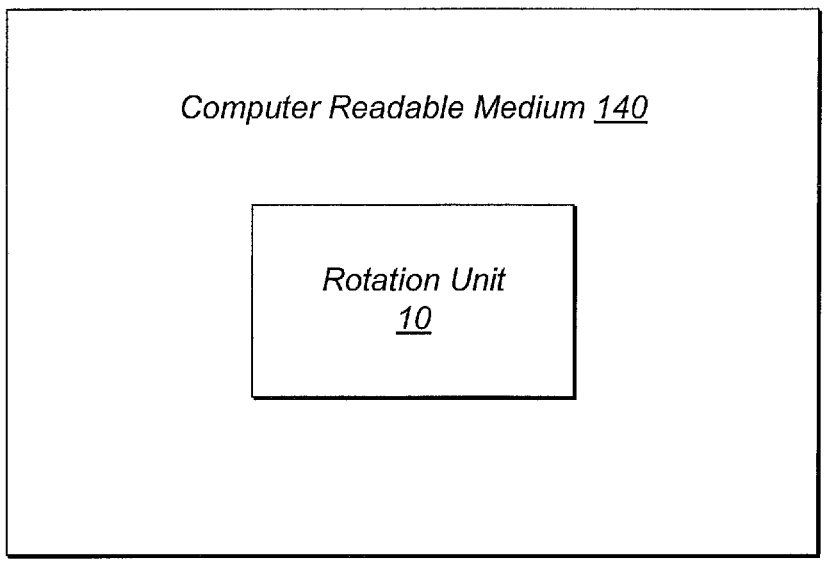
FIG. 12 is a block diagram of one embodiment of a computer readable medium.

Turning now to FIG. 12, one embodiment of a block diagram of a computer readable medium 140 including one or more data structures representative of the circuitry included in rotation unit 10 (of FIG. 1) is shown. Generally speaking, computer readable medium 140 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 140 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 140 may be the netlist(s) (with or without the synthesis library) or the data set(s), as desired. In yet another alternative, the data structures may comprise the output of a schematic program, or netlist(s) or data set(s) derived therefrom.

While computer readable medium 140 includes a representation of rotation unit 10, other embodiments may include a representation of any portion or combination of portions of rotation unit 10 (e.g., fetch unit 12, tile buffers 24-30, lookup table 18).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a fetch unit;
one or more tile buffers; and
a memory coupled to the fetch unit;
wherein the fetch unit is configured to:
generate a plurality of read operations to read pixels from a source image stored in the memory, wherein the plurality of read operations are generated in an order that is based on a rotation being performed on the source image; and
write the pixels to locations within a first tile buffer wherein the rotated image is the source image after the rotation has been performed; and
wherein pixels from a single line of the source image are written to a diagonal line in the first tile buffer if there is not a rotation.

2. The apparatus as recited in claim 1, wherein pixels from a single line of the source image are written to a single line in the first tile buffer if there is a rotation, and wherein the pixels are written to the locations in an arrangement such that a column of pixels of a rotated image can be read out of the first tile buffer in a single clock cycle.

3. The apparatus as recited in claim 2, wherein the source image comprises a plurality of tiles, and wherein each tile buffer is configured to store a single tile of the source image.

4. The apparatus as recited in claim 3, wherein a width of each tile is less than a width of the source image, and wherein a length of each tile is less than a length of the source image.

5. The apparatus as recited in claim 4, further comprising a vertical scaler unit, wherein the first tile buffer comprises a plurality of random access memories (RAMs), wherein each RAM of the plurality of RAMs in the first tile buffer allows only a single pixel to be written to or read from the RAM in a single clock cycle, and wherein the vertical scaler unit is configured to read a single pixel from each RAM of the plurality of RAMs of the first tile buffer in a single clock cycle.

6. The apparatus as recited in claim 5, wherein the vertical scaler unit is configured to read an entire column of pixels from the first tile buffer in a single clock cycle, wherein the entire column of pixels from the first tile buffer corresponds to a column of the rotated image.

7. The apparatus as recited in claim 3, further comprising a table configured to store target pixel locations, wherein the target pixel locations correspond to locations in a given tile buffer, and wherein the fetch unit is configured to:
write the target pixel locations into the table responsive to generating a corresponding read operation;
responsive to receiving pixels from a given read operation, retrieving target pixel locations from the table; and
writing the received pixels to the target pixel locations within a given tile buffer.

8. The apparatus as recited in claim 7, wherein the table is configured to store a transaction identifier (ID) for each entry in the table, wherein the transaction ID corresponds to a specific read operation, and wherein responsive to receiving pixels from the specific read operation, the fetch unit is configured to utilize a corresponding entry in the table to determine target pixel locations within a given tile buffer.

9. The apparatus as recited in claim 7, wherein the fetch unit is configured to generate a given read operation while simultaneously writing corresponding target pixel locations into the table.

10. The apparatus as recited in claim 1, further comprising a memory management unit (MMU), wherein the fetch unit is configured to generate virtual addresses for the plurality of read operations, and wherein the MMU is configured to:
translate the virtual addresses to physical addresses within the memory;
perform read operations to the physical addresses; and
convey retrieved pixels to the fetch unit.

11. The apparatus as recited in claim 10, wherein the fetch unit is further configured to generate prefetch requests to preload virtual address translations.

12. A rotation unit configured to:
receive configuration bits indicating a selected rotation to be performed on a source image;
issue read requests for the source image, wherein the read requests are issued in an order based on the selected rotation;
for each read request, calculate target positions of corresponding pixels in a rotated image, wherein the rotated image is the source image after the selected rotation has been performed;
store the calculated target positions in a table;
receive the pixels from the source image; and
retrieve the calculated target positions and store the received pixels at the calculated target positions within a tile buffer
wherein pixels from a single line of the source image are written to a diagonal line in the tile buffer is there is not a rotation.

13. The rotation unit as recited in claim 12, wherein the source image is partitioned into a plurality of tiles, wherein the tiles are read from the source image in an order based on the selected rotation, wherein the tile buffer is utilized to store an individual tile of the rotated image, wherein pixels from a single line of the source image are written to a single line in the tile buffer if there is a rotation, and wherein the received pixels are stored within the tile buffer in an arrangement such that a column of pixels of a rotated image can be read out of the tile buffer in a single clock cycle.

14. The rotation unit as recited in claim 13, wherein responsive to a subsequent stage of a graphics pipeline fetching the pixels from the tile buffer, the rotation unit is configured to issue read requests for a subsequent tile of the source image.

15. The rotation unit as recited in claim 14, wherein the tile buffer comprises a plurality of random access memories (RAMs), wherein each RAM in the tile buffer allows only a single pixel to be written to or read from the RAM in a single clock cycle, wherein pixels are stored within the tile buffer so as to allow the subsequent stage to read an entire column of pixels from the tile buffer in a single clock cycle, wherein the entire column of pixels from the tile buffer corresponds to a column of the rotated image, and wherein the subsequent stage is a vertical scaler unit.

16. A method comprising:
issuing fetch requests for pixels from a source image, wherein an order in which the fetch requests are issued is based on a specified rotation;
calculating target locations for the pixels, wherein the target locations are calculated based on the specified rotation, and wherein the target locations correspond to locations within a rotated version of the source image; and
receiving and storing the pixels in a tile buffer at the calculated target locations; and
writing pixels from a single line of the source image to a single line in the tile buffer if there is a rotation, and
wherein pixels from a single line of the source image are written to a diagonal line in the first tile buffer if there is not a rotation.

17. The method as recited in claim 16, further comprising:
storing the calculated target locations in a table responsive to issuing the fetch requests; and
looking up the calculated target locations in the table responsive to receiving the pixels.

18. The method as recited in claim 17, further comprising:
wherein the received pixels are stored within the tile buffer in an arrangement such that a column of pixels of a rotated image can be read out of the tile buffer in a single clock cycle.

19. The method as recited in claim 16, wherein the tile buffer comprises a plurality of random access memories (RAMs), wherein each RAM in the tile buffer allows only a single pixel to be written to or read from the RAM in a single clock cycle, the method further comprising reading an entire column of pixels from the tile buffer in a single clock cycle, wherein the entire column of pixels from the tile buffer corresponds to a column of the rotated version of the source image.

20. A method comprising:
partitioning a source image into a plurality of tiles, wherein the partitioning is based on a specified rotation;
reading pixels from a first tile of the source image;
storing the pixels from the first tile in target locations within a tile buffer, wherein the target locations are calculated based on the specified rotation, wherein the rotated image is the source image after the rotation has been performed;
writing pixels from a single line of the source image to a diagonal line in the tile buffer if there is not a rotation;
responsive to detecting the tile buffer has been read by a subsequent stage in a graphics pipeline:
reading pixels from a second tile of the source image; and
storing the pixels from the second tile in the tile buffer.

21. The method as recited in claim 20, further comprising:
writing pixels from a single line of the source image to a single line in the tile buffer if there is a rotation; and
wherein the pixels are stored within the tile buffer in an arrangement such that a column of pixels of a rotated image can be read out of the tile buffer in a single clock cycle.

22. The method as recited in claim 20, wherein the subsequent stage of the graphics pipeline is a scaler unit.

23. The method as recited in claim 22, wherein the tile buffer comprises a plurality of individual random access memories (RAMs), wherein each RAM of the plurality of RAMs in the tile buffer allows only a single pixel to be written to or read from the RAM in a single clock cycle, and wherein the scaler unit is configured to:
read a single pixel from each RAM in the tile buffer in a single clock cycle; and
fetch an entire column of pixels from the tile buffer in a single clock cycle, wherein the entire column of pixels from the tile buffer corresponds to a column of the rotated image.

* * * * *